UNITED STATES PATENT OFFICE.

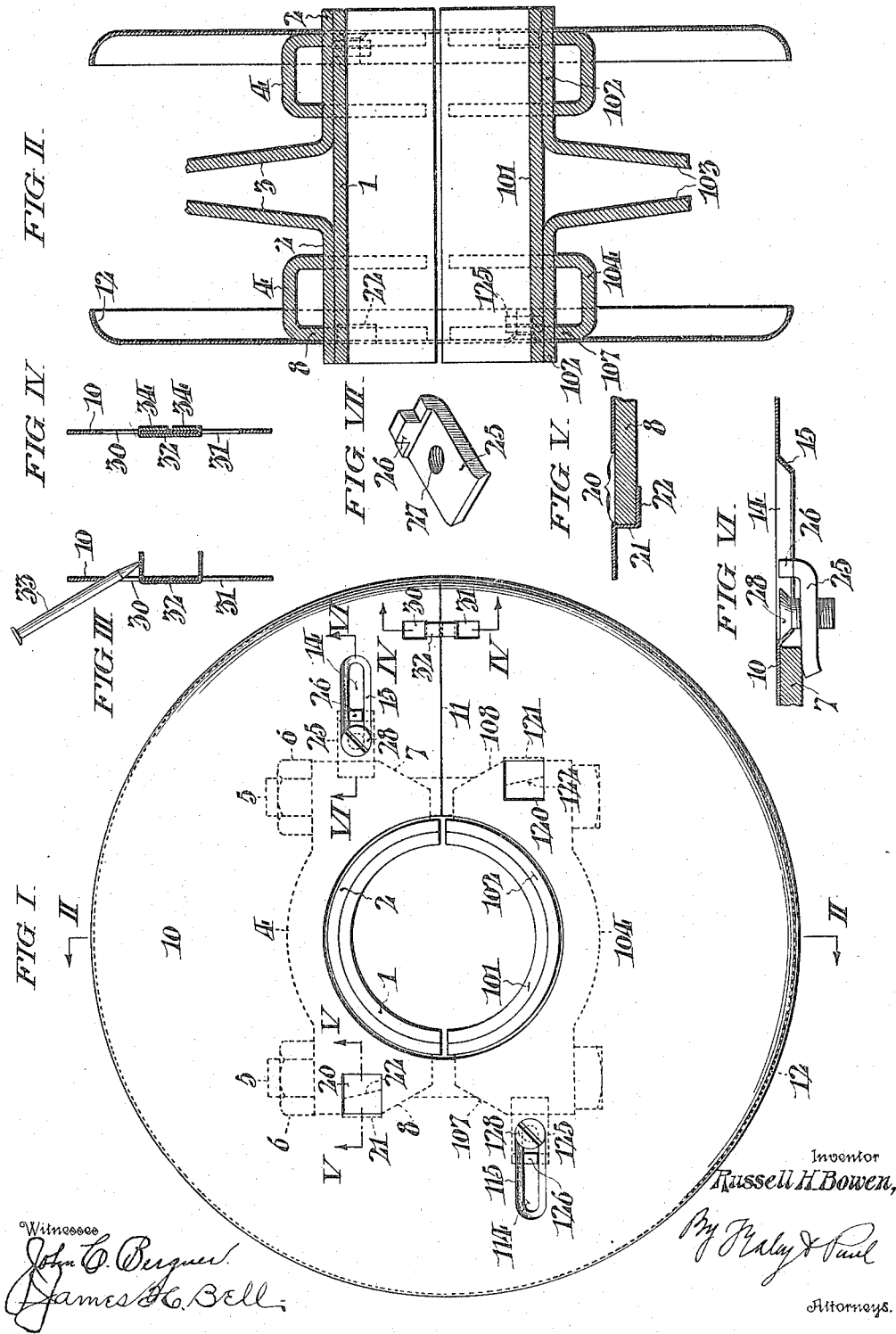

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

GUARD FOR PULLEYS.

1,207,485. Specification of Letters Patent. Patented Dec. 5, 1916.

Application filed October 7, 1916. Serial No. 124,230.

*To all whom it may concern:*

Be it known that I, RUSSELL H. BOWEN, of Philadelphia, in the county of Philadelphia and State of Pennsylvania, have invented a certain new and useful Guard for Pulleys, whereof the following is a specification, reference being had to the accompanying drawings.

My invention is particularly adapted to be used in connection with split pulleys of that type in which a two-part, longitudinally divided, hub-shell is employed, the pulley spokes being secured to the hub-shell by means of hub-clamps provided with bolts and nuts, which latter, as well as the hub clamps themselves, project laterally with relation to the spokes, and may prove a source of danger, especially when the outer rim of the pulley is of less width than the length of the hub portion, and hence does not overhang the projecting parts above mentioned.

The object of my invention is to provide a guard, whereby any laterally projecting parts may be inclosed, said guard being simple in construction, of relatively light weight, and so combined with the pulley proper as to be capable of application with great ease and without requiring special tools.

In the drawings, Figure I, represents a side elevation of the guard, showing its relation to the hub, which appears in end view, the hub clamps and their bolts being shown in dotted lines. Fig. II, is an axial section through the hub, hub clamps and the pair of guards, showing also a portion of the pulley spokes. Fig. III, is a detailed sectional view on an enlarged scale, showing the character of one of the securing devices, and the method of its application. Fig. IV, is a similar sectional view on the line IV, IV, of Fig. I, showing said securing device when completely closed. Fig. V, is a detailed sectional view on the line V, V, of Fig. I, illustrating the nature of another securing device. Fig. VI, is a sectional view on the line VI, VI, of Fig. I, showing the details of another of the securing devices. Fig. VII, is a view in perspective of one of the elements represented in Fig. VI.

As pulleys of the general type illustrated are made in two similar halves, it is not necessary to describe both in detail, and, for purposes of convenience, certain parts of the pulley and coöperating elements, which are indicated by given numerals in one of the halves, are indicated in the other half by the same numerals raised by 100.

The hub-shell 1, carries the semi-annular flanges 2, and the spokes 3, said flanges being secured to the hub by means of the hub-clamps 4, having bolts 5, provided with nuts 6. The edge of the hub-clamps are the parts which are utilized for attachment of the guard about to be described. Said guard consists of a substantially flat annulus 10, of light sheet metal, whose periphery 12, is preferably turned inward, as shown in Fig. II, so as to inclose and overhang the hub-clamps and their bolts and nuts. Said annulus is split preferably on a radial line, as indicated at 11, in Fig. I. At corresponding regions, diametrically opposite to one another, the annulus is provided with elongated slots 14, and 114, whose edges are countersunk, or inwardly dished, as indicated at 15, and 115. In approximately quadrant relation to said slots, the metal is cut on three sides of a rectangle, at the regions 20, and 120, and is bent, as shown in Fig. V, where it will be seen that the flap or tongue projects inwardly for a short distance as indicated at 21, and then is returned parallel to its original plane as indicated at 22. The depth or inward projection of the part 21, corresponds with the thickness of the edge 8, of the hub-clamp.

The slot 14, is provided with a clip 25, (see Figs. VI, and VII), comprising an extended flat portion of greater width than the slot 14, and a projecting shoulder 26, adapted to fit snugly, but move freely, within said slot. The clip 25, is also provided with a threaded hole 27, adapted to receive the screw 28, whose flanged head fits within the countersunk edge 15, of the slot 14, so as not to project beyond the surface of the annulus 10. The other slot 114, is provided with similar elements. At the region of the split 11, the annulus is also provided with a securing means of the following description: Two openings 30, and 31, are formed near the periphery and adjacent to the edges of the split 11, to receive a metal clip 32, whose ends can be bent inward by any simple instrument, such as a nail 33 (see Fig. III), and closed tightly down against the inner face of the metal as shown at 34, in Fig. IV.

Such being the construction of the parts, the method of application (which can be practised without removal of the pulley from its shaft), is as follows: By reason of the split 11, the annulus 10, can be sprung into a spiral position with an opening between the adjacent edges of the slot sufficient to permit it to be slipped over a shaft, and then sprung back into position with the inner face of the annulus resting flat against the outer face of the hub-clamp. The clips 25, and 125, being placed in position and loosely secured by their screws, are slipped to the remote ends of their slots. Assuming that the annulus 10, has been placed upon the hub in such rotative position relatively thereto, that the internally projecting portions 22, are clear of the edges of the hub-clamps, the annulus is turned in a clockwise direction until the projecting portion 22, engages behind the edge 8, of the hub-clamp. When this has been done and the internal projection 21, brought up firmly against the edge 8, of the hub-clamp, the screw clip 25, is slid into engagement behind the inner face of the hub-clamp edge 7, and the securing screw is then tightened, so as to clamp the parts together in the position shown in Fig. VI. A corresponding result will, of course, be obtained at the diametrically opposite part 122, but the description need not be repeated. The clip 32, is locked as indicated in Fig. IV. A similar guard may be applied on the opposite extremity of the hub-shell, and all projecting parts of the pulley can thus be completely shielded. The guard is securely held in position against displacement either in a rotative or axial direction and, as will be noted from the foregoing description, the construction and mode of application are of the simplest character.

I, of course, recognize that it is not new to provide pulleys with guards for the general purpose above indicated, but, so far as I am aware, such guards have lacked the simplicity of structure, lightness and facility of application and removal characteristic of my invention.

I claim:

1. The hereinbefore described improvement in pulley guards, comprising, in combination, a split annulus of sheet metal, adapted to fit upon the pulley hub; means for securing the edges of the split together, and means for securing the body of the annulus to the pulley at a plurality of points, said securing means being substantially non-projecting beyond the external surface of the annulus.

2. The hereinbefore described improvement in pulley guards, comprising, in combination, a split annulus of sheet metal, adapted to fit upon the pulley hub, and having an elongated slot; a clip adapted to slide longitudinally in said slot in engagement with the edges thereof, said clip being adapted to embrace the edge of a member of the pulley, and being provided with a securing screw; said clip and said screw being substantially non-projecting beyond the external surface of the annulus; and means for securing the edges of the split together.

3. The hereinbefore described improvement in pulley guards, comprising, in combination, a split annulus adapted to fit upon the pulley hub, said annulus being provided with an internally projecting tongue adapted to engage rotatively with a member of the pulley; means for securing the edges of the split together; and means for securing the annulus against rotation relatively to the pulley-hub.

In testimony whereof, I have hereunto signed my name at Philadelphia, Pennsylvania, this twenty-fifth day of September, 1916.

RUSSELL H. BOWEN.

Witnesses:
JAMES H. BELL,
E. L. FULLERTON.

Copies of this patent may be obtained for five cents each, by addressing the "Commissioner of Patents, Washington, D. C."